Jan. 27, 1970      W. P. KIRKWOOD ET AL      3,492,519
COMMUTATOR AND COMMUTATOR BLANK FOR DYNAMOELECTRIC MACHINES
AND METHOD OF MAKING SAME
Filed Sept. 11, 1967

INVENTORS
WILLIAM P. KIRKWOOD,
ROBERT H. BOYER,
& EARL V. COCHRAN
BY
McJENNY, FARRINGTON, PEARNE & GORDON
ATTORNEYS

United States Patent Office 3,492,519
Patented Jan. 27, 1970

3,492,519
COMMUTATOR AND COMMUTATOR BLANK FOR DYNAMOELECTRIC MACHINES AND METHOD OF MAKING SAME
William P. Kirkwood, Lakewood, Robert H. Boyer, Westlake, and Earl V. Cochran, Lakewood, Ohio, assignors to Kirkwood Commutator Corporation, Cleveland, Ohio, a corporation of Ohio
Filed Sept. 11, 1967, Ser. No. 666,815
Int. Cl. H01r 39/04
U.S. Cl. 310—235                                25 Claims

ABSTRACT OF THE DISCLOSURE

A commutator and commutator blank for dynamoelectric machines and method of making a commutator having commutator bars, a riser for each bar, end anchoring hooks adjacent at least one end of the commutator, and intermediate anchoring tabs between each end of the commutator. The commutator is formed by providing a flat sheet of conductive material, blanking out portions of one edge of the sheet to form risers, forming longitudinally extending ribs on one surface of the sheet, shearing edge portions of each rib to form intermediate anchoring tabs, and peeling a portion of each riser to curl that portion beneath a later formed commutator bar to form an anchor hook for the bar.

BACKGROUND OF THE INVENTION

This invention relates to a commutator and method of making a commutator from a metallic blank and from a moldable resinous composition. Commutators often comprise a cylindrical plastic body portion having a plurality of commutator bars or segments embedded in the surface of the body. The bars each have a riser integral therewith extending beyond the body portion of the commutator. One method of manufacturing commutators involves providing a flat blank of conductive material such as copper and blanking out portions of one edge of the blank to form risers thereon. The blank is then formed into a cylinder and a plastic core is molded within the cylinder so formed. In order to divide the cylinder into separate bars, the surface of the cylinder is cut through to the supporting plastic core to provide a plurality of individual commutator bars or segments.

Since the commutator bars are often subjected to substantial centrifugal forces, particularly in high speed devices, mechanical interlocking between the plastic and bars is usually employed to secure the bars in place.

For example, and as is shown in U.S. Patent No. 2,400,590 to Meyerhoefer, an anchoring lug may be blanked out of the strip adjacent each riser. The anchoring lugs are then bent radially inwardly prior to the pressure molding step so that each anchoring lug is securely embedded in the plastic. Although such lugs provide an adequate anchoring means for some types of commutators, such a technique becomes impractical where small diameter commutators must be provided with a relatively large number of bars. The lack of sufficient spacing between the risers in such commutators prevents the formation of such anchor lugs.

In order to overcome the problem space limitations between each riser, it has been proposed to strike out a portion of each riser to povide an anchoring tab. In U.S. Patent No. 2,602,988 to Klym, such a technique is illustrated. Although the technique shown in the Klym patent tends to reduce the problem of close spacing between risers, it does so at the expense of the strength of the riser and does not provide an adequate solution when very narrow bars are required. Variations of the Klym approach are illustrated in the Apple Patent No. 1,578,-793 and the Wahlberg Patent No. 2,535,825. However, these patents also fail to provide a suitable arrangement for commutators with very narrow bars.

Other anchoring arrangements have been proposed wherein anchoring means are provided at closely spaced intervals along the length of the bar. Such arrangements tend to prevent bulging of the mid portion of the bar and are sometimes used for high speed commutators where the problem is particularly severe. It has been proposed to provide longitudinally extending ribs on the plastic-contacting surface of the blank, and then upset portions of each rib across its entire width. Such a technique is disclosed in U.S. Patent No. 2,658,159 to Herbst. However, such upsetting tends to produce plastic flow through the thickness of the blank, which tends to distort the blank and cause undesirable bulges. Also, such upsetting does not produce sharp laterally extending undersurfaces on the tabs so that the resulting anchoring is not sufficiently effective for some commutator uses.

SUMMARY

There are two aspects of this invention. In one of its aspects, this invention provides an improved anchoring structure to secure the riser end of the bar. This structure is particularly useful in commutators with narrow bars. In its other aspect, this invention provides improved anchoring along the entire length of the bar. These two anchoring arrangements can be used separately or in combination.

In accordance with the first aspect of this invention, the risers are longitudinally split along a plane which is not perpendicular to the metal blank, to produce a hook which is subsequently embedded in the plastic to anchor the riser end of the bar. The thickness of the blank is selected to provide sufficient material so that both the riser and hook have sufficient strength.

In accordance with the other aspect of the invention, the blank is provided with longitudinal ribs and tabs are sheared from the edge of the ribs without substantial upsetting. These tabs provide relatively sharp laterally extending undersurfaces which provide improved anchoring.

It is therefore a principal object of the present invention to produce a commutator by slicing anchoring hooks from riser portions of a commutator blank.

It is another object of this invention to provide an improved anchor structure at closely spaced locations along the commutator bar.

DESCRIPTION OF THE PREFERRED EMBODIMENT

Figure 1:
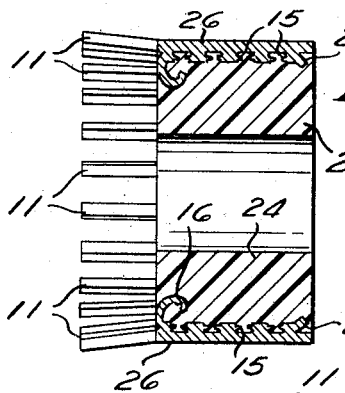
FIGURE 1 is a cross-sectional view of a completed commutator according to this invention.
Figure 5:
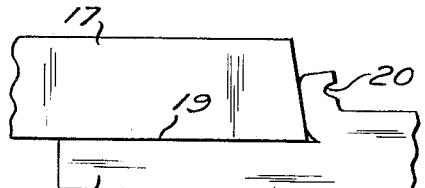
FIGURE 5 is a fragmentary elevational view of a tool forming an anchor hook according to this invention.
Figure 2:
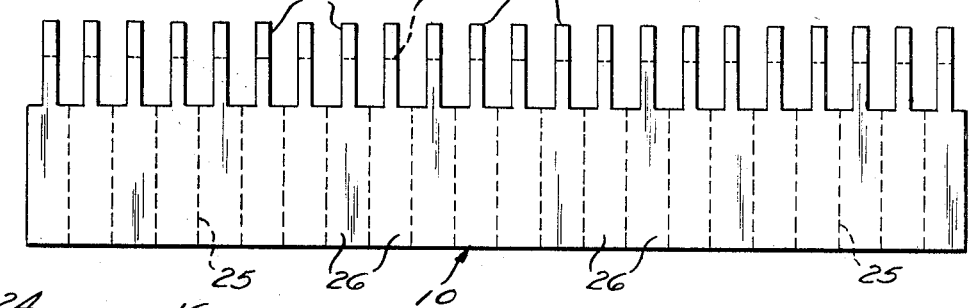
FIGURE 2 is a plan view of a commutator blank.

Referring now to the drawings, the commutator blank 10 is illustrated. The commutator blank 10 comprises a strip of conductive metal such as copper and has one edge which is notched to define a multiplicity of risers 11.

When the commutator is formed, each riser 11 is welded, soldered or otherwise affixed to an electrical conductor. The blank 10 is cut to a length which defines the circumference of the commutator to be formed.

Figure 6:
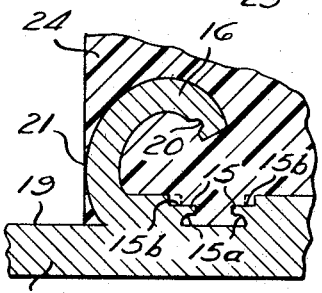
FIGURE 6 is an enlarged, fragmentary, cross-sectional view of a portion of the commutator illustrated in FIGURE 1.
Figure 3:
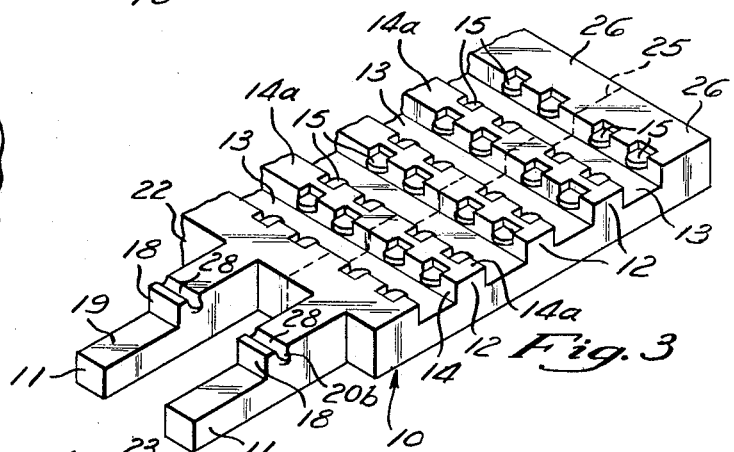
FIGURE 3 is a fragmentary perspective view of a portion of the blank illustrated in FIGURE 2, showing the surface of the blank which will form the interior of the commutator segments.
Figure 4:
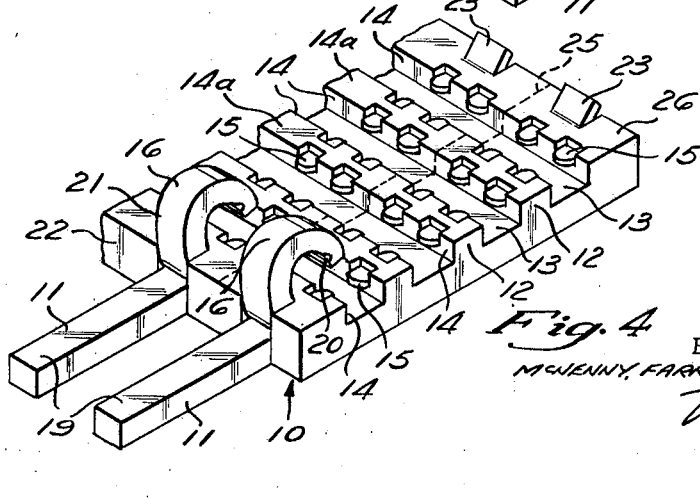
FIGURE 4 is a fragmentary perspective view, similar to FIGURE 3, but showing the blank after end anchoring hooks have been formed thereon.

As may be seen in FIGURES 3 and 4, a plurality of longitudinally extending ribs 12 are formed by stamping, drawing, extruding or milling a plurality of longitudinally extending slots 13 in the blank 10. The ribs 12 are defined by vertical sides 14 and a horizontal top surface 14a. In the completed commutator, these sides 14 and surfaces 14a would be radial sides and axially extending surfaces, respectively. Corner portions of each rib are sheared to form a multiplicity of anchor tabs 15 to anchor intermediate portions of each commutator segment to be formed. The anchor tabs 15 are preferably spaced along the ribs 12 so that at least two tabs 15 are provided on each later formed commutator bar. The anchor tabs 15 are formed by shearing only a small corner portion of each rib 12 to form the burr-like anchor tabs 15 illustrated in FIGURES 1 and 6. These tabs 15 provide an under-surface 15a, best illustrated in FIGURE 6, which extends laterally from the vertical sides 14 and provides a strong mechanical interlocking with the plastic when commutator is completed.

It has been found that if the tabs 15 were formed by an indentation which extends across the entire width of each rib 12, the resulting anchoring tab would be more in the shape of a dovetail and that its undersurface tends to be much more inclined relative to the bottom surface of the slot. However, when only a small portion is engaged by the tool immediately adjacent to the corner, the upsetting is minimized and deforming process closely approximates a shearing or scarfing action. With such shearing or scarfing, the metal at the edge is turned with a minimum of upsetting and the undersurface is closer to parallel with the bottom wall of the slots 13. In the illustrated embodiment the tool which engages the corner has an end face perpendicular to the line of action so the upper surface 15b is parallel to the surface 14a. However, if desired a slight angle, usually less than 15° may be provided. Such an angle tends to improve the shearing action.

Further, by shearing only a corner portion of each rib 12, the tabs 15 are formed by a peeling action which does not tend to cause plastic upsetting flow of the metal completely through the blank 10. Therefore, the blank is not distorted when the tabs are formed. On the other hand, when upsetting is used to form tabs, the blank is distorted and changes in dimension, usually by being bowed and increasing in length. According to this invention, the shearing of each rib 12 should extend less than halfway across the width of the rib and, preferably, extend as small a distance as possible from the corner. In practice it has been found that satisfactory results are achieved when the tool engages the top surface 14a within 0.013 inch and, preferably, about 0.010 inch from the corner measured inwardly across the top surface 14a from its corner intersection with a side 14.

As may be seen most clearly in FIGURES 3, 4, 5, and 6, each commutator segment to be formed is provided with an anchor hook 16. The anchor hooks 16 are formed by slicing or scarfing a bottom portion of each riser 11 with a suitable tool 17 and curling the sliced portion over the commutator segment to be formed. The slicing should be along a slicing plane which is either skewed or perpendicular with respect to planes normal to the surface of the blank 10. In the illustrated embodiment, the slicing plane is perpendicular to such planes and, therefore, parallel to the surface of the blank 10. To facilitate the slicing and curling operation, the risers 11 may be provided with a step 18 so that the tool 17 may ride along a planar surface 19 of each riser 11.

Improved anchoring is provided when a laterally extending surface 20 is provided on the hook 16. Such surface tends to resist lengthwise movement out along the plastic. Such lateral surface is provided in the illustrated embodiment by forming a groove 28 on the blank before slicing the hook. In the preferred method of manufacture, this groove is produced by an upsetting tool which produces additional bulging at the ends 20b. This provides additional laterally extending surfaces.

Normally, a second anchor projection is formed at the opposite end of the bar. A variety of arrangements may be used for this purpose. For example, anchor fingers 23 may be sheared from the opposite edge of the blank so that the other end of each commutator segment to be formed will be securely anchored in the plastic. When greater anchoring is required at the end opposite the hook 16, as when the intermediate anchor structure of the tabs 15 is not used, other forms of hooks may be used. For example, anchors of the type illustrated in the Klym patent cited above may be employed in place of the fingers 23 to provide the necessary strength.

With the blank 10 formed in the manner illustrated in FIGURE 4, the blank 10 is then rolled into a cylinder, placed in a suitable die cavity (not shown), and a suitable plastic 24 is molded within the cylinder thus formed. The plastic flows around the hooks 16, the tabs 15, and the fingers 23 so that the metallic cylinder is firmly held in place.

The cylinder thus formed is then sliced along the dotted lines 25 to form a plurality of commutator segments 26. Of course, it should be appreciated that this cutting operation should extend through the metal, including the ribs 12, to the plastic material so that the individual bars are electrically separated.

The laterally extending surface 20 on the end of the hook 16 interlocks with the plastic and functions to resist forces tending to cause the hook to slide lengthwise out of the plastic. The hook itself provides a strong anchoring structure for the riser end of the bar, but when it is provided with a lateral surface 20, still greater strength is achieved.

In some commutators, the hook 16 and some form of tab 23 is used without the intermediate anchoring structure of the tabs 15. On the other hand, the rib 12 and tab 15 structure is sometimes used without separate end anchors. For example, some very small commutators do not provide sufficient thickness of the plastic to permit the use of large end anchors. However, when the commutator bars are subjected to very high forces, as, for example, in very high speed devices, the hook 16 is combined with the tabs 15 and 23 so that maximum anchoring is achieved.

The invention is not restricted to the slavish imitation of each and every detail set forth above. Obviously, devices and techniques may be provided which change, eliminate, or add certain specific details without departing from the scope of this invention.

What is claimed is:

1. A commutator having a cylindrical plastic body portion and a plurality of metallic commutator bars embedded in the surface of the body, each bar having a riser extending from one end thereof, the improvement comprising elongated anchoring means for one end of each bar, each of said anchor means having one end integrally connected to a juncture zone between a riser and a commutator bar and having a portion of the connected end in radial alignment with its bar and riser, said anchor means providing a portion spaced from said one end extending beneath its bar so that the anchor means is firmly embedded in the plastic body portion of the commutator.

2. The commutator according to claim 1 wherein the anchor means is provided with a laterally extending surface substantially adjacent its other end interlocking with said plastic and resisting lengthwise movement of said anchor means.

3. The commutator according to claim 1 wherein the anchor means extends along a curved axis and is provided with a lateral groove adjacent its other end.

4. The commutator according to claim 1 wherein additional and intermediate anchor means are provided along the length of each commutator bar.

5. The commutator according to claim 4 wherein said additional anchoring means includes at least one rib formed on each commutator bar, each such rib having substantially radial sides intersecting with a substantially axially extending top, and each such rib having a corner portion sheared so that an anchor tab extends outwardly beyond a radial side, said corner portion comprising only a portion of the width of the axially extending top of the rib and only a portion of the side adjacent said top.

6. The commutator according to claim 5 wherein the sheared portion of the axially extending top of the rib extends less than halfway across the width of the rib.

7. The commutator according to claim 6 wherein the sheared portion of the axially extending top of the rib extends less than 0.013 inch measured across the width of the rib from the intersection between a radial side and the axially extending top surface of the rib.

8. The commutator according to claim 5 wherein the sheared portion of the axially extending top of the rib extends about 0.010 inch measured across the width of the rib from the intersection betwen a radial side and the axially extending top surface of the rib.

9. In a commutator having a cylindrical plastic body portion and a plurality of metallic commutator bars embedded in the surface of the body comprising anchoring means along the length of each commutator bar, said anchoring means including at least one rib formed on each commutator bar, each such rib having substantially radial sides intersecting with a substantially axially extending top, and each such rib having a corner portion sheared so that an anchor tab extends outwardly beyond a radial side, said corner portion comprising only a portion of the width of the axially extending top of the rib and only a portion of the side adjacent said top.

10. The commutator according to claim 9 wherein the sheared portion of the axially extending top of the rib extends less than halfway across the width of the rib.

11. The commutator according to claim 9 wherein the sheared portion of the axially extending top of the rib extends less than 0.013 inch measured across the width of the rib from the intersection between a radial side and the axially extending top surface of the rib.

12. The commutator according to claim 9 wherein the sheared portion of the axially extending top of the rib extends about 0.010 inch measured across the width of the rib from the intersection between a radial side and the axially extending top surface of the rib.

13. The commutator according to claim 9 wherein an additional and end anchoring means is provided at the end of each commutator segment.

14. A blank for forming a commutator comprising a strip of conductive metal, a plurality of risers extending from one edge of said strip, a plurality of anchor means each of which has one end integrally connected to a juncture zone between a riser and said strip and having a least a portion of the connected end in a plane perpendicular to said strip and passing through a riser, the remaining portions of the anchor means being curled over said strip along a curved axis.

15. The commutator blank according to claim 14 wherein the other end of the anchor means is provided with a lateral groove portion.

16. The commutator blank according to claim 14 wherein said means provides a laterally extending surface substantially adjacent to other end.

17. The commutator blank according to claim 14 wherein the improvement comprises additional and intermediate anchoring means on the surface of the blank.

18. The commutator blank according to claim 17 wherein said additional anchoring means includes at least one longitudinally extending rib along the surface of the blank, each such rib having substantially vertical sides intersecting with a substantially horizontal top, and each such rib having a corner portion sheared so that an anchor tab having a laterally extending undersurface extends outwardly beyond a vertical side, said corner portion comprising only a portion of the width of the horizontal top of the rib and only a portion of the side adjacent said top.

19. The commutator blank according to claim 18 wherein said laterally extending undersurface is substantially perpendicular to the vertical side.

20. A commutator blank having a plurality of risers extending from one edge thereof, a plurality of anchoring means on one surface of said strip, said anchoring means being defined by at least one rib formed on said surface, each such rib having substantially vertical sides intersecting with a substantially horizontal top, and each such rib having a corner portion sheared so that an anchor tab having a laterally extending undersurface extends outwardly beyond a vertical side, said corner portion comprising only a portion of the width of the horizontal top of the rib and only a portion of the side adjacent said top.

21. The commutator blank according to claim 20 wherein said laterally extending undersurface is substantially perpendicular to the vertical side.

22. A method of making a commutator comprising the steps of providing a strip of conductive metal, notching one edge of the strip to provide a plurality of risers thereon, slicing a portion of each riser inwardly toward the body of the blank along a non-parallel plane with respect to planes normal to the body of the blank and curling the sliced portion of the riser over the remainder of the strip to form an anchor hook.

23. The method according to claim 22 wherein the slicing plane is parallel to planes defining the surfaces of the blank.

24. The method according to claim 22 comprising the steps of forming at least one longitudinal rib along the body of the blank, each such rib having substantially vertical sides intersecting with a substantially horizontal top, shearing a corner portion of each such rib to form an anchor tab extending laterally outwardly beyond a vertical side, said corner portion comprising only a portion of the width of the horizontal top of the rib and only a portion of the side adjacent said top.

25. A method of making a commutator comprising the steps of providing a strip of conductive metal, notching one edge of the strip to provide a plurality of risers thereon, forming at least one longitudinal rib along a surface of said strip, each such rib having substantially vertical sides intersecting with a substantially horizontal top, shearing a corner portion of each such rib to form an anchor tab extending laterally outwardly beyond a vertical side, said corner portion comprising only a portion of the width of the horizontal top of the rib and only a portion of the side adjacent said top.

References Cited

UNITED STATES PATENTS

| 1,994,062 | 3/1935 | Bonanno | 310—235 X |
| 2,038,419 | 4/1936 | Cotterman | 310—235 |
| 2,535,824 | 12/1950 | Wahlberg | 29—597 X |
| 2,602,988 | 7/1952 | Klym | 29—190 |
| 2,634,495 | 4/1953 | Callsen et al. | 29—597 |
| 3,102,965 | 9/1963 | Ickes et al. | 310—235 |
| 3,223,869 | 12/1965 | Reisnecker | 310—234 |
| 3,251,120 | 5/1966 | Reisnecker | 310—235 X |
| 3,376,443 | 4/1968 | McColl | 310—235 |

WARREN E. RAY, Primary Examiner

U.S. Cl. X.R.

29—190, 193.5, 597